US007004199B1

(12) United States Patent
Funes et al.

(10) Patent No.: US 7,004,199 B1
(45) Date of Patent: Feb. 28, 2006

(54) FLUID CONTROL APPARATUS

(75) Inventors: Warner F. Funes, San Jose, CA (US); Gregory W. Ochs, Fremont, CA (US); Shigeru Itoi, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 10/910,789

(22) Filed: Aug. 4, 2004

(51) Int. Cl.
*F16K 11/10* (2006.01)

(52) U.S. Cl. ...................................................... 137/884

(58) Field of Classification Search ................ 137/269, 137/270, 271, 597, 884
See application file for complete search history.

(56) References Cited

U.S. PATENT DOCUMENTS 6,109,303 A * 8/2000 Itafuji et al. ................ 137/884
6,152,175 A * 11/2000 Itoh et al. ................... 137/602
6,502,601 B1 * 1/2003 Eidsmore et al. ........... 137/884
6,546,961 B1 * 4/2003 Fukushima ................. 137/884

* cited by examiner

*Primary Examiner*—John Fox
(74) *Attorney, Agent, or Firm*—Armstrong, Kratz, Quintos, Hanson & Brooks, LLP

(57) ABSTRACT

Line interconnecting means interconnecting two lines adjacent to each other laterally thereof comprises a lateral projection 64*b* formed on a two-way connecting block coupling 64 of the first of the lines, a recessed portion 54*c* formed in a two-way connecting block coupling 64 of the second of the lines for the lateral projection 64*b* to fit in, a coupling branch channel 82 formed in the block coupling 64 provided with the lateral projection, a first valve body branch channel 90A formed in the body 54*a* of a shut-off valve 54 of the first line for always causing a main channel 89 in the valve body to communicate with the coupling body upper surface opening 82*a* of the coupling branch channel 82, and a second valve body branch channel 90B formed in the body 54*a* of a shut-off valve 54 of the second line for always causing a main channel 89 in the valve body to communicate with a lateral projection upper surface opening of the coupling branch channel 82.

9 Claims, 8 Drawing Sheets

FLUID CONTROL APPARATUS

BACKGROUND OF THE INVENTION

The present invention relates to fluid control apparatus for use in semiconductor manufacturing equipment, and more particularly to integrated fluid control apparatus which are so assembled that fluid control devices can be individually removed upward for maintenance and inspection.

As to the terms "front," "rear," "upper" and "lower" used herein, the right-hand side of FIGS. 1 to 3 is referred to as "front," the left-hand side thereof as "rear," and the upper and lower sides of FIG. 3 are referred to as "upper" and "lower," respectively, and the terms "left" and "right" are used for the apparatus or the component thereof as it is seen from behind toward the front. The terms front, rear, upper and lower are used for the sake of convenience; the apparatus may be used with its front and rear portions positioned in opposite relation, or with the upper and lower sides thereof positioned as the left and right sides.

Fluid control apparatus for semiconductor manufacturing equipment comprise various fluid control devices as arranged in a plurality of rows, and the fluid control devices in adjacent rows have their channels interconnected by device connecting means at a predetermined location. Such fluid control apparatus are made integrated in recent years by connecting a mass flow controller and shut-off valves without using tubes. For example, Patent Literature 1 (the publication of JP-A NO. 2002-89798) discloses a fluid control apparatus comprising a plurality of lines arranged in parallel on a base plate and each comprising a plurality of fluid control devices arranged in an upper stage and a plurality of coupling members arranged in a lower stage, each of the lines having an inlet facing rearward and an outlet facing forward, the channels of specified lines being connected to one another by line interconnecting means.

FIG. 10 is a perspective view showing an example of fluid control apparatus disclosed in Patent Literature 1. The apparatus comprises as arranged in parallel on a base plate 1 three lines A1, A2, A3 having no bypass, and three lines B1, B2, B3 having a bypass. Each of the lines A1, A2, A3, as well as each of the lines B1, B2, B3, comprises a plurality of fluid control devices 2, 3, 4, 5, 6, 7 including a mass flow controller, shut-off valve and shutoff-opening device and arranged in an upper stage, and a plurality of coupling members 11, 12, 13, 14, 15, 16, 17, 40 arranged in a lower stage for interconnecting the fluid control devices 2, 3, 4, 5, 6, 7, 41.

The fluid control devices of each of the lines A1, A2, A3 having no bypass are the mass flow controller 2, inlet shut-off valve 3 connected via a filter 4 to the inlet side of the mass flow controller 2 and outlet shut-off valve 5 provided at the outlet side of the controller 2. The fluid control devices of each of the lines B1, B2, B3 having a bypass are the mass flow controller 2, inlet shutoff-opening device 6 connected via a filter 4 to the inlet side of the mass flow controller 2 and outlet shutoff-opening device 7 provided at the outlet side of the controller 2.

The inlet shutoff-opening device 6 comprises a body 21 in the form of a block, two shut-off valve actuators 22, 23 mounted on the body 21, a coupling 24 in the form of a block, having a tubular connector, and mounted on the top wall of the body 21, and a channel block 25 mounted on a side wall of the body. The outlet shutoff-opening device 7 comprises a first body (not shown) in the form of a block and disposed close to the mass flow controller 2, a first shut-off valve actuator 27 mounted on the first body, a second body 28 in the form of a block and disposed adjacent to the rear side of the first body, two shut-off valve actuators 29, 30 mounted on the second body 28, etc.

Provided in the fluid control apparatus are inverted U-shaped bypass pipes 35 extending above respective mass flow controllers 2. Each bypass pipe 35 has a tubular coupling 36 for making the pipe 35 separable into an inverted L-shaped portion and an I portion.

The mass flow controllers 2 and couplings 11, 12, 14 are attached to the base plate 1 by inverted U-shaped brackets 8, 9, 19. Each mass flow controller 2 is singly removable upward by removing couplings 15, 17 from opposite sides thereof. The filters 4 and the shut-off valves 3, 5 are individually removable upward by removing screws 37 driven in from above.

Indicated at 40 is a coupling in the form of a manifold block for connecting the three lines A1, A2, A3 having no bypass to one another although it is a single coupling. Indicated at 43 is a single coupling in the form of a manifold block for connecting the three lines B1, B2, B3 having a bypass to one another. Indicated at 41 are channel closing blocks attached to the coupling 40 with screws 37. Indicated at 42 is an inverted U-shaped bracket for attaching the couplings 40, 43 to the base 1. The manifold block coupling 40 is connected to the manifold block coupling 43 by a communication pipe 44. These couplings have a common outlet which is provided by the terminal end of the coupling 43. A shut-off valve 45 having a tubular coupling 46 is provided at this end.

The bypass-equipped lines B1, B2, B3 are so interconnected that the block couplings 24 of the inlet shutoff-opening devices 6 thereof are connected to one another, and block couplings 33, each having a second tubular connector, of the outlet shutoff-opening devices 7 are connected to one another, respectively by inverted U-shaped communication pipes 47, 48 serving as line interconnecting means. An L-shaped coupling L and a T-shaped coupling T are used for each of these line interconnecting means 47, 48, and these coupling L, T are joined to the pipe P by welding (as indicated at W in the drawing).

In the case of the fluid control apparatus disclosed in Patent Literature 1, each line has block couplings arranged in the lower stage and removably attached to a base plate, each fluid control device in the upper stage is removably mounted on two block couplings in the lower stage, and the fluid control devices of each line are made easy to remove and mount individually. However, since the line interconnecting means comprises couplings which are welded to a pipe for connection, the apparatus has the problem of necessitating time and labor for interconnecting the lines and disconnecting the lines from one another when lines are to be added or the arrangement of lines is to be altered.

To solve this problem, Patent Literature 2 (the publication of JP-A No. 2004-183771) discloses a fluid control apparatus comprising a plurality of lines arranged in parallel on a base plate and each comprising a plurality of fluid control devices arranged in an upper stage and a plurality of coupling members arranged in a lower stage, each of the lines having an inlet facing rearward and an outlet facing forward, the channels of specified lines being connected to one another by line interconnecting means, the fluid control apparatus being characterized in that the line interconnecting means comprises lower channel blocks arranged respectively in the upper stages of the specified lines to be connected in the same position with respect to the front-to-rear direction and each provided with a line interconnecting channel having at least one upward opening, and one or a plurality of upper channel blocks arranged over the lines to be connected on the upper side of the lower channel block and each having a lateral channel extending orthogonal to the lines and a downward channel extending from the lateral channel and communicating with the upward opening of the line interconnecting channel of the lower channel block, the lower channel blocks being removably fastened to the lower stage channel members with screws from above, the upper channel blocks being removably fastened to the lower channel blocks with screws from above.

The fluid control apparatus of Patent Literature 2 has the advantage of eliminating welded portions from the line interconnecting means and being amenable to the addition or modification of lines, but has the problem of being increased in the number of kinds of channel blocks, and still remains to be improved.

SUMMARY OF THE INVENTION

An object of the present invention is to provide an integrated fluid control apparatus which has line interconnecting means for interconnecting channels of lines and which is reduced in the increase in the number of components (kinds of channel blocks, i.e., of block couplings) in eliminating welded portions from the line interconnecting means, the apparatus thus being made more amenable to the addition or modification of lines.

The present invention provides a fluid control apparatus which comprises a plurality of lines, each of the lines comprising a lower layer having a plurality of coupling members arranged in a front-to-rear direction and an upper layer having a plurality of fluid control devices arranged in a front-to-rear direction and wherein a front and a rear block coupling serving as lower layer components of each line and a shut-off valve mounted as an upper layer component on both the front and rear block couplings are arranged laterally of the line, a front-to-rear channel in the front block coupling and a front-to-rear channel in the rear block coupling being closable or openable by operating an actuator of the shut-off valve. The fluid control apparatus is characterized in that at least one of line interconnecting means interconnecting a first and a second line adjacent to each other laterally thereof comprises a lateral projection formed on one of the front and rear block couplings of the first line, a recessed portion formed in the block coupling of the second line for the lateral projection to fit in, a coupling branch channel formed in the block coupling provided with the lateral projection and having an end opening in a coupling body upper surface and another end opening in an upper surface of the lateral projection, a first valve body branch channel formed in a body of the shut-off valve of the first line for always causing a main channel in the valve body to communicate with the coupling body upper surface opening of the coupling branch channel, and a second valve body branch channel formed in a body of the shut-off valve of the second line for always causing a main channel in the valve body to communicate with the lateral projection upper surface opening of the coupling branch channel.

For example, two line interconnecting means are provided at each of the inlet side and outlet side for interconnecting the first and second lines adjacent to each other laterally thereof. In this case, the four means may of course have the construction described above, but only the two means at the outlet side may have the above construction. The other means not having the above construction then has, for example, a lower layer comprising a bridge pipe block extending laterally and provided for a plurality of block couplings as arranged laterally. The bridge pipe block is provided with a plurality of lateral channels for causing an adjacent pair of block couplings to communicate with each other through a channel in the body of a shut-off valve.

The upper surfaces of the lower layer, as well as the lower surfaces of the upper layer, are made flush, so that the lower-end openings of the fluid control devices and the upper-end openings of the coupling members are positioned in the same plane. Each fluid control device has a body provided with a channel having an opening at its lower end, and the coupling member has a channel communicating with the lower-end opening of the channel in the body of the fluid control device. When required, the fluid control device and the coupling member are provided with a channel having an opening in the lateral direction or forward or rearward direction. A seal portion is provided at the joint of channels.

With the fluid control apparatus of the present invention, at least one of line interconnecting means comprises a lateral projection formed on one of the front and rear block couplings of the first line, a recessed portion formed in the block coupling of the second line for the lateral projection to fit in, a coupling branch channel formed in the block coupling provided with the lateral projection and having an end opening in a coupling body upper surface and another end opening in an upper surface of the lateral projection, a first valve body branch channel formed in a body of the shut-off valve of the first line for always causing a main channel in the valve body to communicate with the coupling body upper surface opening of the coupling branch channel, and a second valve body branch channel formed in a body of the shut-off valve of the second line for always causing a main channel in the valve body to communicate with the lateral projection upper surface opening of the coupling branch channel. Accordingly, the line interconnecting means can be fabricated without welding, and block couplings having the lateral projection and the recessed portion can be made to have the same contour as other block couplings when the lateral projection is fitted into the recessed portion of like coupling adjacent thereto. This reduces an increase in the number of components, ensures flexible design and results in improved amenability to maintenance.

When an additional line is to be provided, a space having a width slightly larger than the width of one line (larger by an amount corresponding to the lateral projection) is prepared between adjacent lines to provide a new line (having incorporated therein components other than shut-off valves) in the space. The lateral projection of the block coupling of the first line is then fitted into the recessed portion of block coupling of the second line, the lines are positioned closer to each other and fixed in place, and shut-off valves are finally incorporated into the new line. A similar procedure is performed when lines are to be modified. In this way, lines can be additionally provided or modified easily.

The present invention provides a fluid control apparatus of the construction described above wherein at a location where there is no line interconnecting means, a fluid control portion for closing or opening a front-to-rear channel (extending longitudinally of the line) is provided by a front one-way connecting block coupling having a front-to-rear channel and having no lateral channel, a rear one-way connecting block coupling having a front-to-rear channel and having no lateral channel and a one-way connecting valve body having a front-to-rear channel and having no lateral channel, and at a location where there is the line interconnecting means, a fluid control portion for closing or opening a front-to-rear channel (extending longitudinally of the line) and for closing or opening a channel (orthogonal to the line) is provided by a front or rear two-way connecting block coupling having a front-to-rear main channel and a lateral branch channel, a rear or front one-way connecting block coupling having a front-to-rear channel and having no lateral channel and a two-way connecting valve body having a front-to-rear main channel and a lateral branch channel.

The contour of the two-way connecting block coupling is the shape of the one-way connecting block coupling provided with the lateral projection and/or the recessed portion. The one-way connecting block coupling is rectangular parallelepipedal, and such a coupling of basic construction can be made from one kind of material of rectangular cross section. Since the two-way connecting block coupling is similar to the one-way connecting block coupling in shape, block couplings can be fabricated by a reduced amount of special work. Block couplings can be fabricated by working in one direction using a three-axis working machine.

Coupling members including the block couplings and providing the lower layer are fixed in intimate contact with one another to a base plate with screw members and are thereby positioned in place with respect to the front-to-rear direction. This ensures a tolerance to provide a suitable seal between the coupling member and the fluid control device to be mounted thereon.

Amass flow controller is arranged on two block couplings spaced apart from each other. In this case, a spacer is provided between the couplings supporting the controller thereon. Fluid control devices serving as upper layer components are each provided on an adjacent pair of front and rear coupling members and fixed to the coupling members with screw members, whereby a fluid control apparatus which is reliably sealed can be assembled without welding. The lateral projection provided on the two-way connecting block coupling is fitted into the recessed portion formed in the two-way connecting block coupling laterally adjacent thereto for positioning with respect to the lateral direction. Thus, the two-way connecting block coupling has not only the function of causing a fluid to flow in two directions but also the function of positioning the component concerned in place.

Preferably, the line interconnecting means comprises a plurality of two-way connecting block couplings one of which is positioned at one end of the line interconnecting means and has no lateral projection and no branch channel, and the others of which each have the lateral projection and the branch channel. The two-way connecting block coupling positioned at one end (interfering with other line) of the line interconnecting means has no lateral projection and no branch channel, whereby the coupling can be made free of interference with other line. The number of block couplings can be reduced by eliminating one-way connecting block couplings which are provided with a lateral projection only.

The plurality of lines include an inert gas line, a treatment gas line and purge gas line, and not only the inert gas line and the treatment gas line but also the purge gas line preferably comprises the lower layer and the upper layer. The lower layers of the lines including the purge gas line are each in the form of a single layer, and the coupling members of the lower layers are made easy to install and remove.

The front-to-rear channel in the front block coupling and the front-to-rear channel in the rear block coupling are V-shaped when seen from the lateral direction, and the branch channel in the two-way connecting block coupling is V-shaped when seen from the front-to-rear direction.

DETAILED DESCRIPTION OF THE PREFERRED EMBODIMENT

An embodiment of the present invention will be described below with reference to the drawings.

Figure 1:
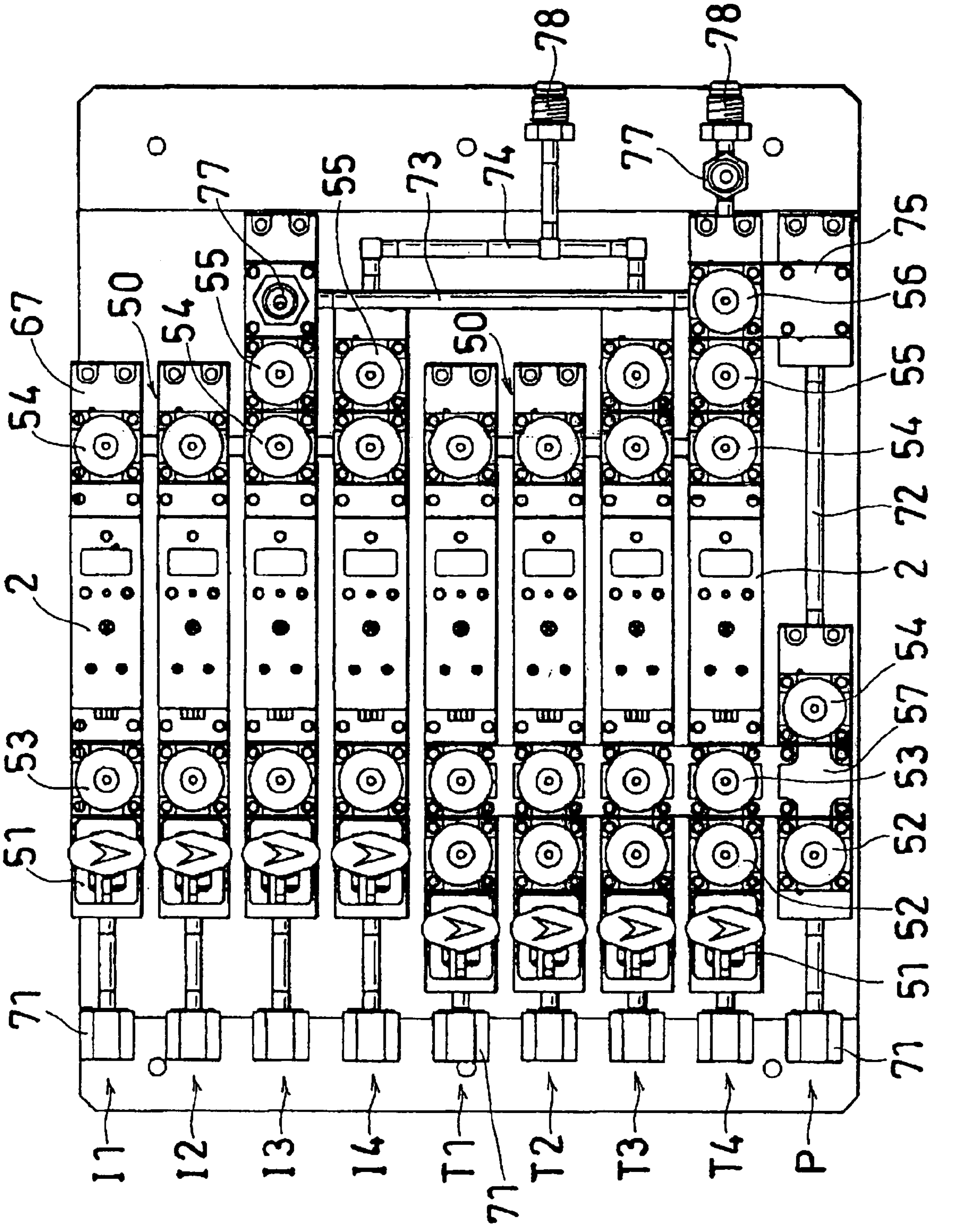
FIG. 1 is a plan view showing the overall construction of a fluid control apparatus.
Figure 2:
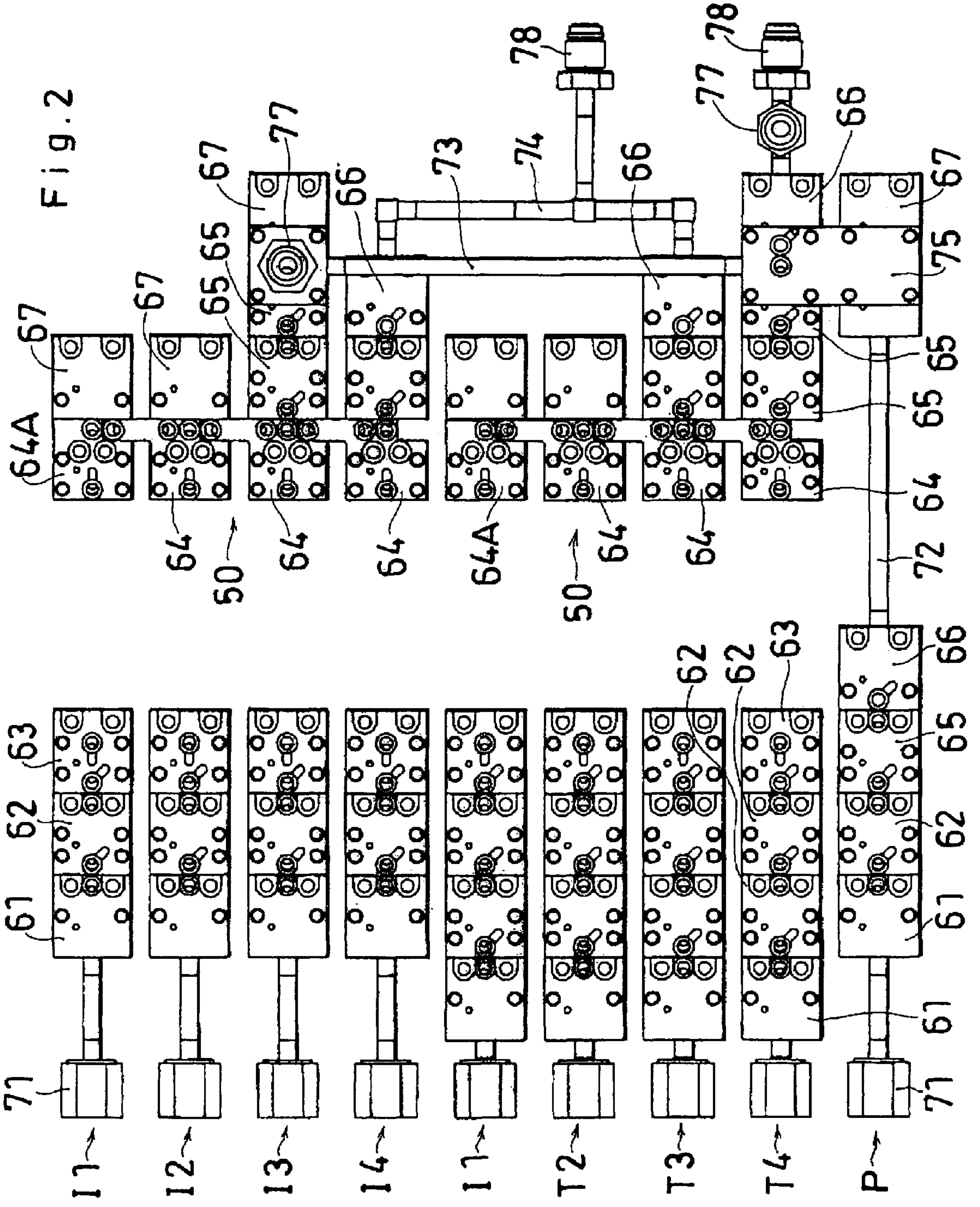
FIG. 2 is a plan view showing a lower layer of the fluid control apparatus of the invention.

FIGS. 1 and 2 show the overall construction of a fluid control apparatus of the invention.

The fluid control apparatus has a plurality of lines I1, I2, I3, I4, T1, T2, T3, T4, P including inert gas lines I1, I2, I3, I4, treatment gas lines T1, T2, T3, T4 and one purge gas line P. Each of the lines I1, I2, I3, I4, T1, T2, T3, T4, P comprises a lower layer (FIG. 2) having a plurality of block couplings 61, 62, 63, 64, 65, 66 arranged forward or rearward, and an upper layer (FIG. 1) having a plurality of fluid control devices 2, 51, 52, 53, 54, 55, 56 arranged forward or rearward.

Figure 3:
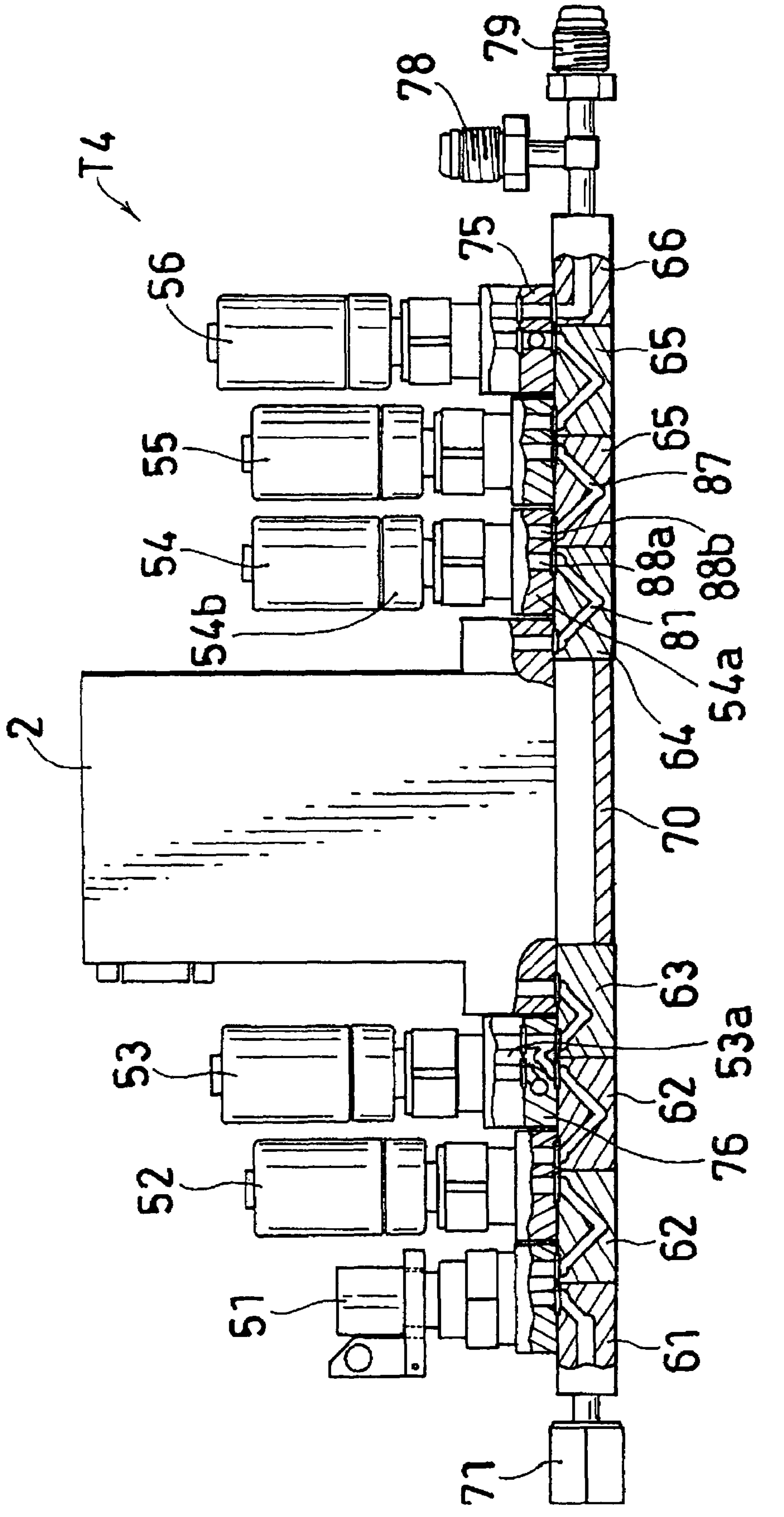
FIG. 3 is a view in longitudinal section showing an example of construction of one line included in the fluid control apparatus.

FIG. 3 shows the construction of the line T4 as an example of construction of one line. The line T4 comprises a mass flow controller 2 constituting the upper layer, four inlet-side block couplings 61, 62, 62, 63 arranged at the inlet side of the controller and constituting the lower layer, three fluid control devices 51, 52, 53 each provided on forwardly or rearwardly adjacent two of these couplings 61, 62, 62, 63 and constituting the upper layer, four outlet-side block couplings 64, 65, 65, 66 arranged at the outlet side of the controller 2 and constituting the lower layer, and three fluid control devices 54, 55, 56 each provided on forwardly or rearwardly adjacent two of the outlet-side couplings 64, 65, 65, 66 and constituting the upper layer.

The mass flow controller 2 is mounted on both the block coupling 63 which is the foremost of the four inlet-side block couplings 61, 62, 62, 63 and the block coupling 64 which is the rearmost of the four outlet-side block couplings 64, 65, 65, 66. A spacer 70 in intimate contact with the two block couplings 63, 64 supporting the controller 2 thereon is interposed between these couplings 63, 64, whereby the couplings 63, 64 are positioned in place. The other block couplings 61, 62, 62, 65, 65, 66 are positioned in place each by being in intimate contact with the coupling adjacent thereto.

The inlet-side fluid control devices 51, 52, 53, as arranged from a position away from the controller 2 toward the controller, are a manual valve 51, first shut-off valve 52 and second shut-off valve 53, respectively. The outlet-side fluid control devices 54, 55, 56, as arranged from a positioned close to the controller 2 toward the front, are a first shut-off valve 54, second shut-off valve 55 and third shut-off valve 56, respectively.

The inert gas lines I1, I2, I3, I4 and the treatment gas lines T1, T2, T3 other than the line T4 are the same as or similar to the line T4 in construction. Like components are referred to by like reference numerals, and the lines I1, I2, I3, I4, T1, T2, T3 will not be described individually. The purge gas line P has no mass flow controller, and has an upper layer comprising two shut-off valves 52, 54 and a closing block 57 disposed between these valves, and a lower layer comprising block couplings 61, 62, 65, 66 supporting these valves 52, 54 and block 57 thereon and a forward or rearward channel closing block coupling 67 connected to the rear block coupling 66 by a pipe 72.

The lines I1, I2, I3, I4, T1, T2, T3, T4, P each have an inlet pipe joint 71. The inert gas lines I1, I2, I3, I4, as well as the treatment gas lines T1, T2, T3, T4, are connected together by line interconnecting means 50 which is the main feature of the present invention, at the outlet side of the mass flow controllers 2. An outlet block coupling 65 of the inert gas line I3 is connected to an outlet block coupling 65 of the treatment gas line T4 by a pipe 73. Further an outlet block coupling 66 of the inert gas line I4 is connected to an outlet block coupling 66 of the treatment gas line T3 by a pipe 74. With reference to FIG. 2, a bridge pipe block 75 is mounted on both an outlet block coupling 66 of the treatment gas line T4 and the forward or rearward channel closing block coupling 67 of the purge gas line P across a space therebetween. A purge gas is distributed from the purge gas line P to the lines I1, I2, I3, I4, T1, T2, T3, T4 via this bridge pipe block 75. Indicated at 76 in FIG. 3 is a quintuple bridge pipe block provided between the block couplings 62, 63 and the body 53*a* of the shut-off valve 53 at the inlet side of the controller 2. At this portion, the upper layer has a two-layer structure comprising the bridge pipe block 76 and the valve body 53*a*.

The inert gas line I3 has a discharge upward pipe joint 77 of the pipe 73 connected to the treatment gas line T4. The pipe 74 connecting the insert gas line I4 to the treatment gas line T3 has a discharge forward pipe joint 78. Upward and forward two discharge pipe joints 77, 78 are provided at a channel outlet of the block coupling 66 of the treatment gas line T4.

Figure 9:
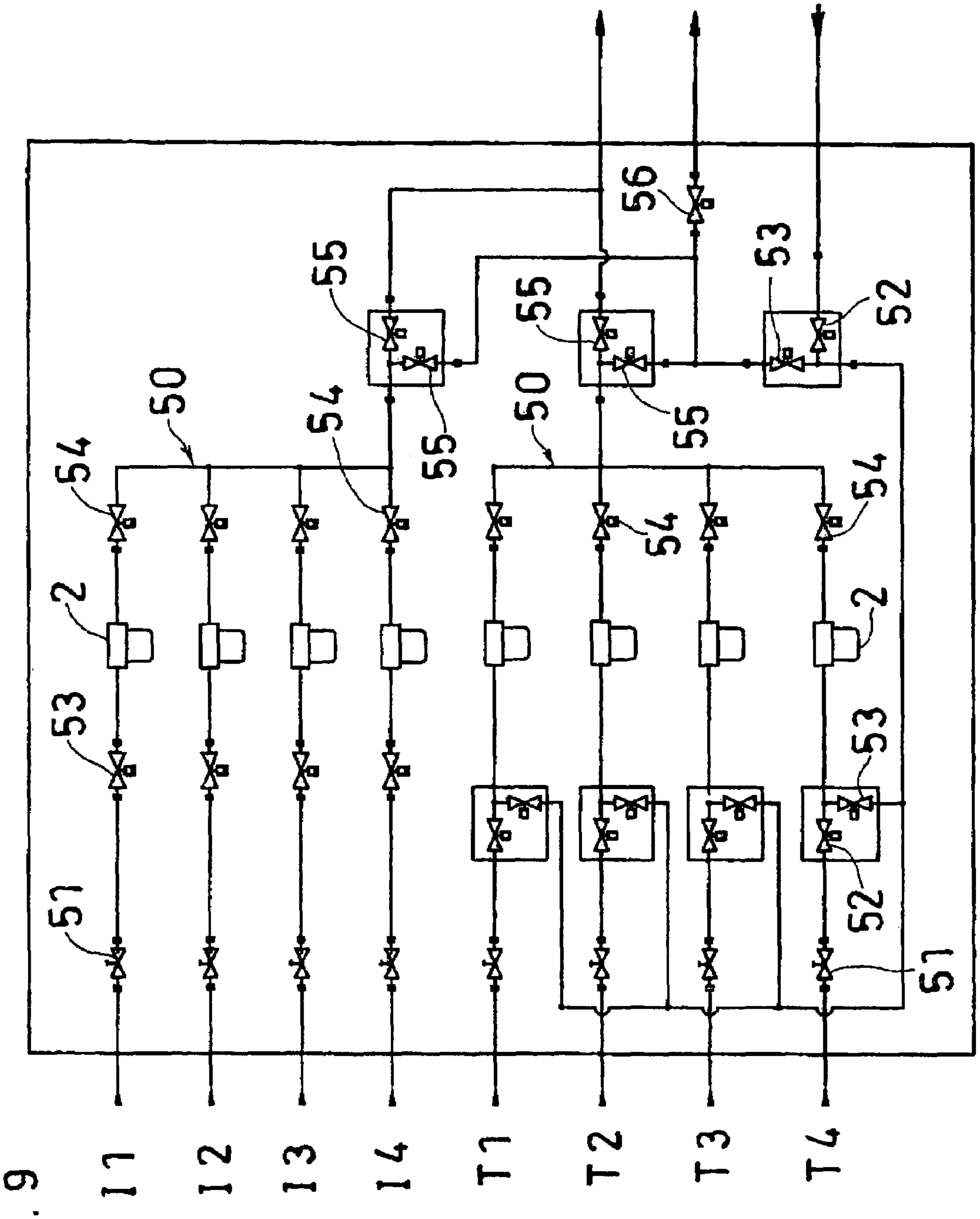
FIG. 9 is a flow chart of the fluid control apparatus of the invention.
Figure 10:
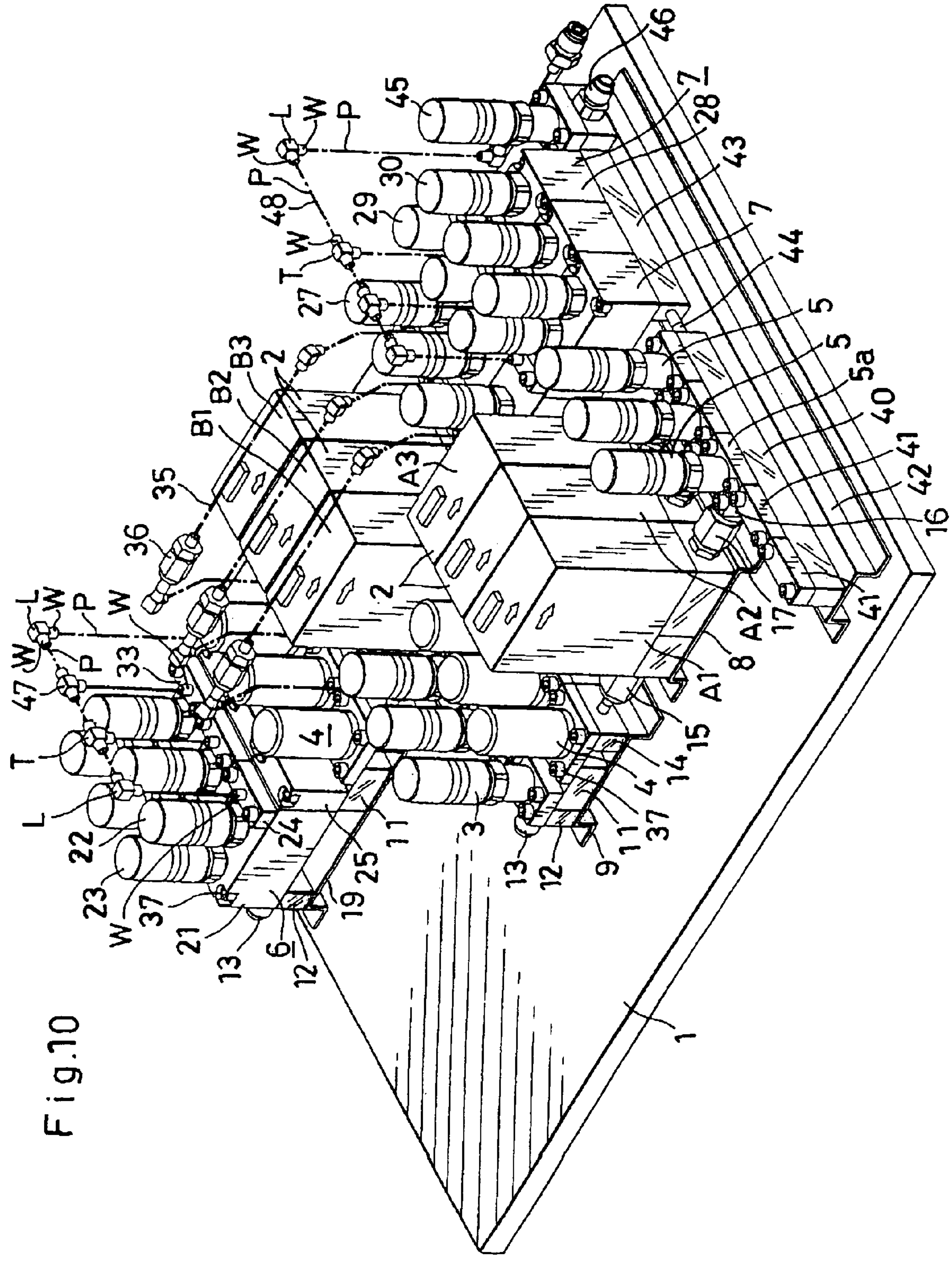
FIG. 10 is a perspective view showing a conventional fluid control apparatus.

FIG. 9 is a flow chart showing the directions of flows of fluids through the lines I1, I2, I3, I4, T1, T2, T3, T4, P and division or confluence of flows between the lines I1, I2, I3, I4, T1, T2, T3, T4, P.

The line interconnecting means 50 has a two-way connecting block coupling 64 or 64A and a one-way connecting block coupling 65 or 67 which are arranged in the forward direction in the lower layer of the lines I1 to I4 or T1 to T4, and a shut-off valve (upper layer) 54 mounted on both of these block couplings 64 or 64A, and 65 or 67. The two-way connecting block couplings 64 other than the coupling 64A positioned at one end each have a forward or rearward main channel 81 and a lateral branch channel 82. The two-way coupling 64A at the end has a forward or rearward channel 81 only. The one-way connecting block coupling 65 has a forward or rearward channel 87 only, and the one-way connecting block channel 67 is adapted to close a forward or rearward channel. The shut-off valve 54 comprises a two-way connecting valve body 54*a* and an actuator 54*b*. The two-way connecting valve body 54*a* has forward or rearward main channels 88*a*, 88*b* and a lateral branch channel (not shown in FIG. 3, see FIG. 8).

FIGS. 4 to 7 show the construction of the two-way connecting block coupling 64 in detail. The coupling 64 comprises a rectangular parallelepipedal body 64*a*, a lateral projection 64*b* projecting leftward from the front wall portion of the body 64*a* and a recessed portion 64*c* formed by cutting away a right part from the front wall portion of the body 64*a*. The coupling 64 has a main channel 81 extending forward or rearward in the midportion, with respect to the lateral direction, of the main body 64*a* and V-shaped when seen from the lateral direction, and a branch channel 82 V-shaped when seen from the forward or rearward direction and extending from an upper-surface opening 82*a* of the body which opening is a small distance laterally (leftwardly) away from an upper-surface front opening (outlet) 81*a* of the main channel 81 to an upper-surface opening 82*b* in the left end part of the lateral projection 64*b*.

The recessed portion 64*c* of the coupling 64 is formed by cutting away as large a front wall portion as possible insofar as the main channel 81 remains intact, and the lateral projection 64*b* is so shaped that the outer-end half of the projection will snugly fit into the recessed portion 64*c* of another coupling 64 adjacent to the coupling 64. The lower layers of the lines I1, I2, I3, I4, T1, T2, T3, T4, P are arranged laterally as spaced apart from one another by a small distance as shown in FIG. 2, and the amount of projection of the lateral projection 64*b* minus the amount of recess of the recessed portion 64*c* is equal to the spacing between the lower layers of the lines I1, I2, I3, I4, T1, T2, T3, T4, P.

Figure 4:
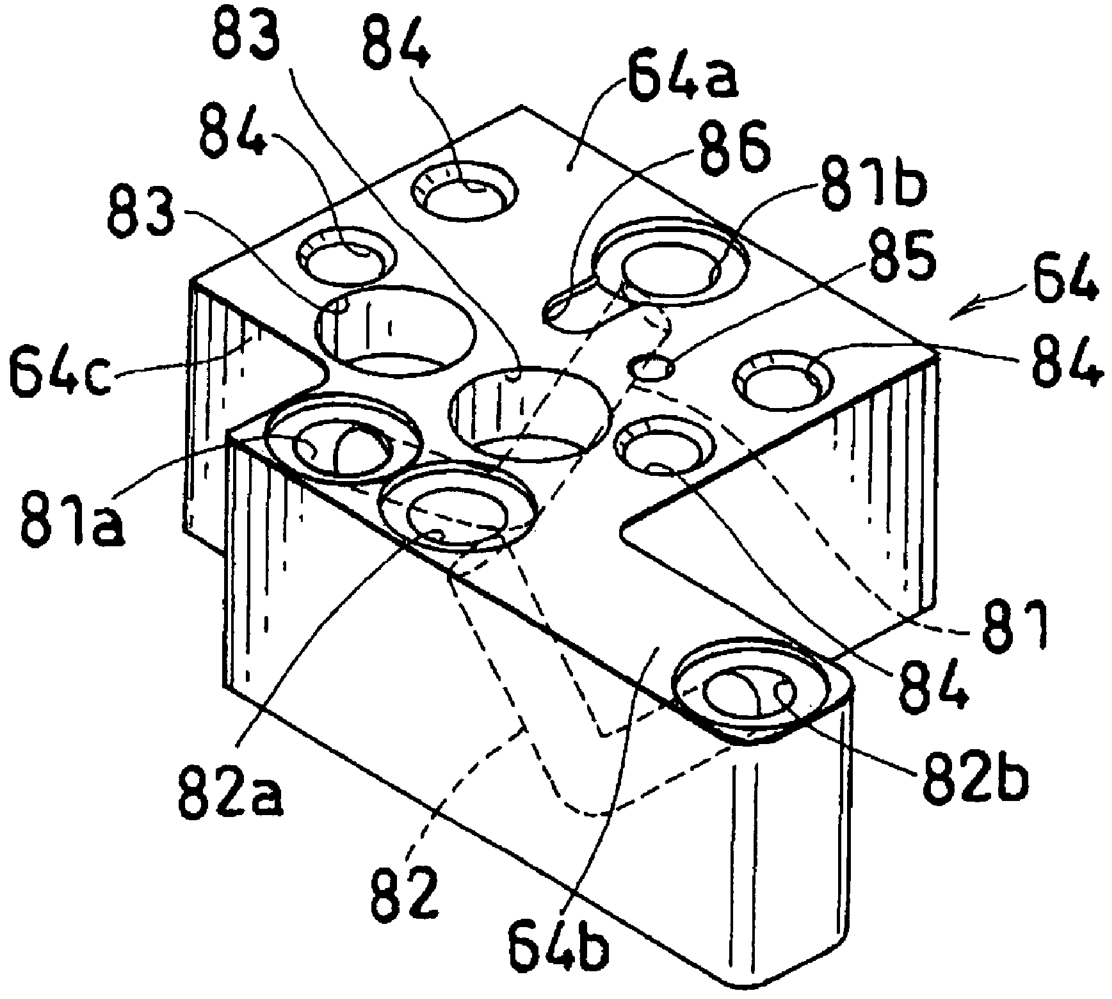
FIG. 4 is a perspective view showing a two-way block coupling constituting line interconnecting means.
Figure 5:
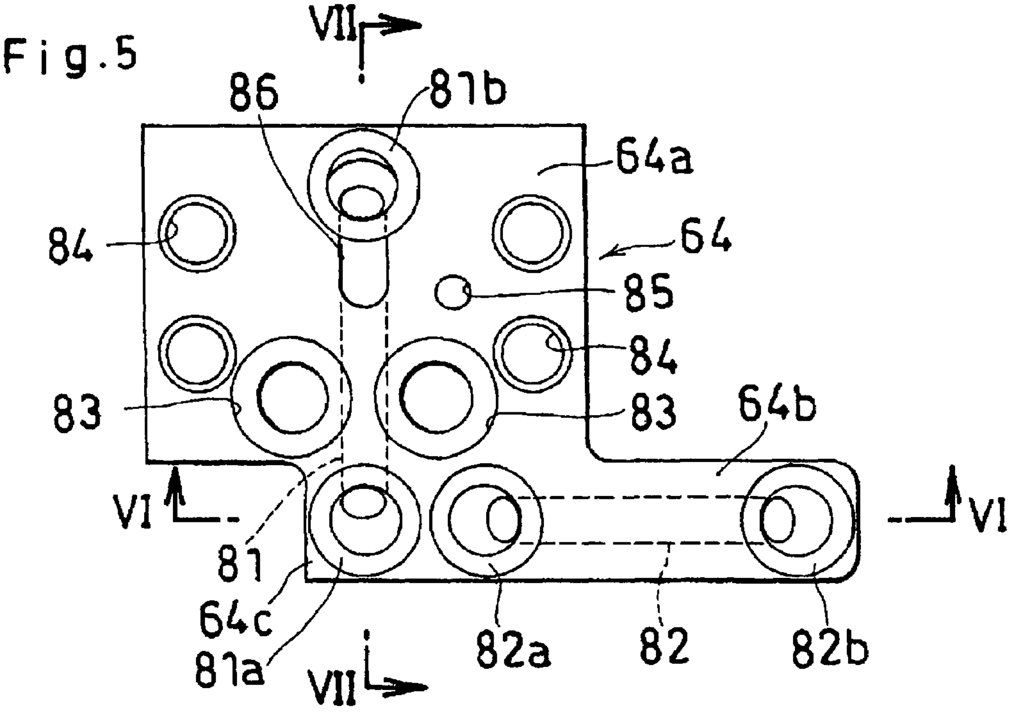
FIG. 5 is a plan view of the same.
Figure 6:
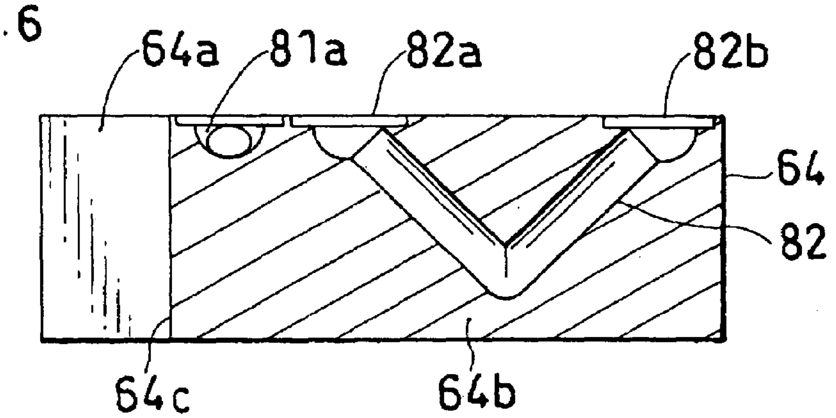
FIG. 6 is a view in section taken along the line VI—VI in FIG. 5.
Figure 7:
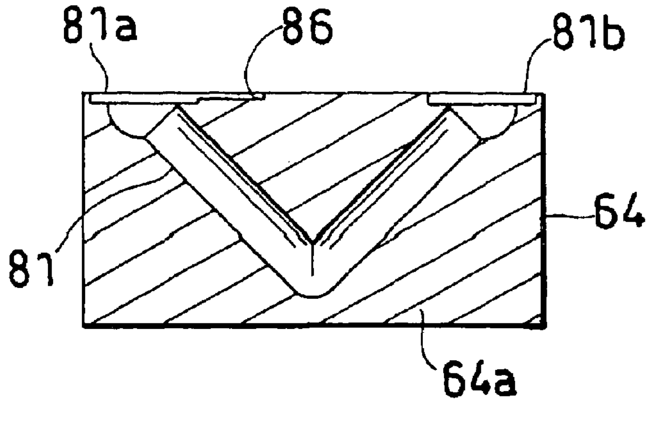
FIG. 7 is a view in section taken along the line VII—VII in FIG. 5.

With reference to FIGS. 4 and 5, indicated at 83 are through holes for inserting therethrough bolts for attaching the block coupling 64 to the base plate 1, and at 84 are bottomed threaded bores for screwing thereinto bolts for mounting the fluid control device (shut-off valve) body 54*a*. Indicated at 85 and 86 are leak ports for detecting leaks. The upper-surface openings of the block coupling 64 are each provided with a seal portion (there is no seal portion except at the upper-surface openings). The block coupling 64 is attached to the body 54*a* of the shut-off valve 54 with the seal portions provided therebetween. Accordingly, the seal portion can be checked for leakage by the leak port 85 communicating with the upper-surface opening sealed by the seal portion and the leak port 86 which is isolated.

Although not shown, block couplings 62, 65, etc. correspond to the two-way connecting block coupling 64 described from which the branch channel 82 is omitted and which is in the form of a perfect rectangular parallelepiped.

With reference to FIG. 3, the body 54*a* of the two-way connecting valve used in the line interconnecting means 50 is provided inside thereof with an inlet channel 88*a* communicating with the block coupling 64 on the rear side thereof and an outlet channel 88*b* communicating with the block coupling 65 on the front side thereof. The opening of the inlet channel 88*a* is shut off or opened by an actuator 54*b*. The bodies of the other values, i.e., of the manual valve 51 and the shut-off valves 52, 53, 55, 56, are also each provided with an inlet channel and an outlet channel (no reference numerals are given) in communication with the corresponding couplings included among block couplings 61, 62, 63, 64, 65, 66.

Figure 8:
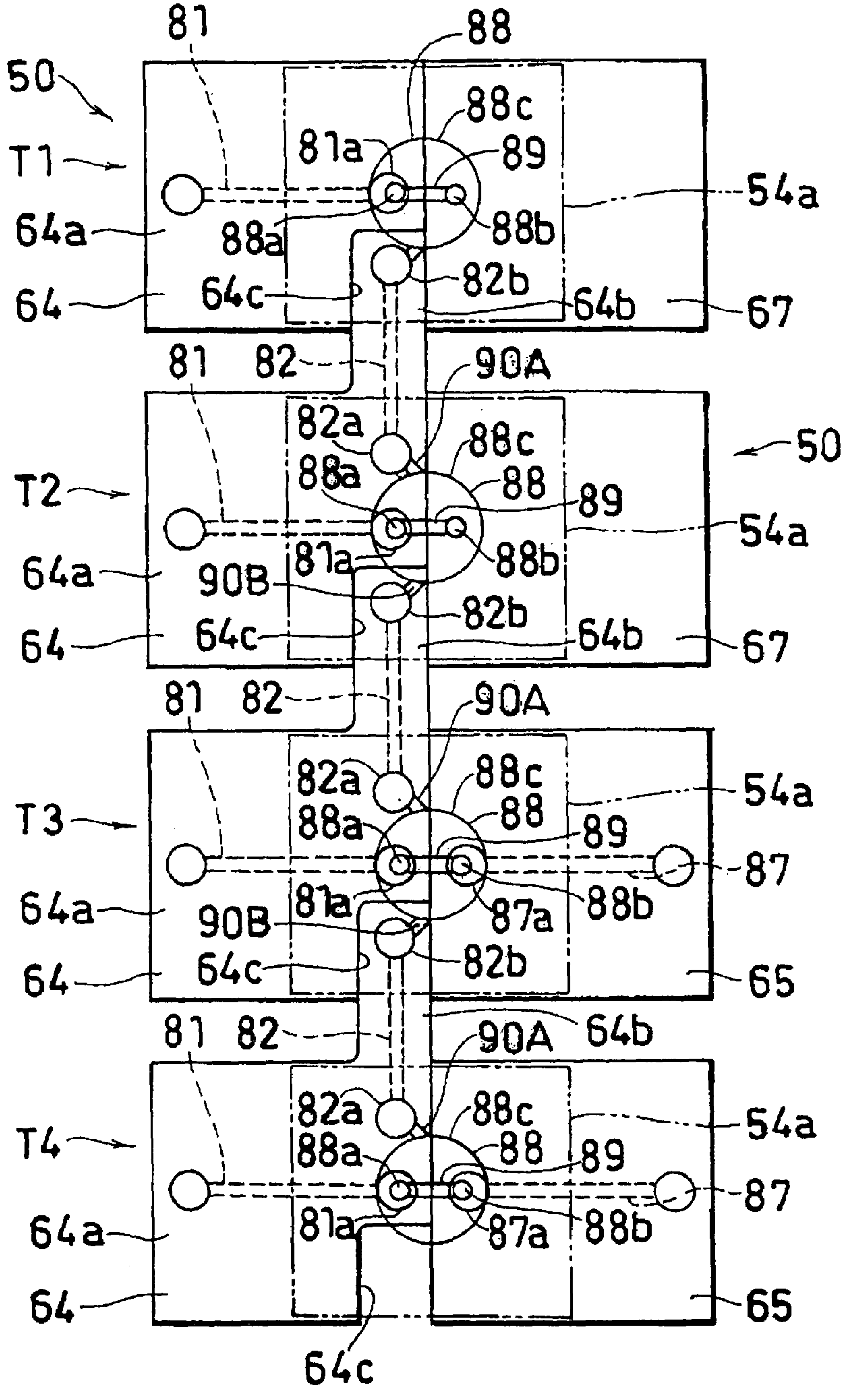
FIG. 8 is a plan view showing channels of the line interconnecting means.

FIG. 8 shows the channels of the line interconnecting means 50. (The two means 50 for the inert gas lines I1 to I4 and for the treatment gas lines T1 to T4 are exactly the same in construction.)

As shown in the drawing, the two-way connecting valve body 54*a* of each shut-off valve 54 has channels 88 which include, in addition to the inlet channel 88*a* and outlet channel 88*b* shown in FIG. 3, one or two branch channels 90A, 90B each having one end in communication with a channel 88*c* around the valve seat and the other end communicating with the upper-surface openings 82*a*, 82*b* of the branch channel 82 of the two-way connecting block coupling 64. Since the opening of the inlet channel 88*a* is shut off or opened by the actuator 54*b*, the inlet channel 88*a*, the channel 88*c* around the valve seat and the outlet channel 88*b* provide a main channel 89 to be shut off or opened by the actuator 54*b*. FIG. 8 schematically shows the channels 88, 88*a*, 88*b*, 88*c*, 89, 90A, 90B as drawn in solid lines and made readily distinguishable from the block coupling channels (indicated in broken lines) 81, 82, 87 and openings (indicated by larger circles) 81*a*, 82*a*, 82*b*, 87*a*.

The block coupling 64 of the fourth line T4 has a lateral projection 64*b* and also has a main channel 81 in the forward or rearward direction and a lateral branch channel 82. Although the coupling 64 of the fourth line need not have the recessed portion 64*c*, the coupling having the recessed portion 64*c* is used for a reduction in the number of components.

The one-way connecting block coupling 65 of the fourth line T4 has a channel 87 extending forward or rearward in the midportion, with respect to the lateral direction, of its body and V-shaped when seen from the lateral direction.

The two-way connecting valve body 54*a* of the fourth line T4 has channels 88 which include a main channel 89 comprising an inlet channel 88*a*, channel 88*c* around the valve seat and outlet channel 88*b*, and a branch channel 90A extending leftward from the channel 88*c* around the valve seat and communicating with the body upper-surface opening 82*a* of the branch channel 82 in the two-way connecting block coupling 64 of the fourth line T4. The main channel 89 connects the main channel 81 in the block coupling 64 of the fourth line T4 to the forward or rearward channel 87 in the one-way connecting block coupling 65 of the fourth line T4 to permit or block the communication between the channels.

The two-way connecting block coupling 64 of the third line T3 has a recessed portion 64*c* for fitting therein the lateral projection 64*b* of the two-way connecting block coupling 64 of the fourth line T4 and a lateral projection 64*b* having the same shape as the lateral projection 64*b* of the coupling 64 of the fourth line T4, and further has a forward or rearward main channel 81 and a lateral branch channel 82.

The one-way connecting block coupling 65 of the third line T3 has a channel 87 extending forward or rearward in the midportion, with respect to the lateral direction, of its body and V-shaped when seen from the lateral direction.

The two-way connecting valve body 54*a* of the third line T3 has channels 88 which include a main channel 89 comprising an inlet channel 88*a*, channel 88*c* around the valve seat and outlet channel 88*b*, a branch channel 90B extending rightward from the channel 88*c* around the valve seat and communicating with the projection opening 82*b* of the branch channel 82 in the two-way connecting block coupling 64 of the fourth line T4, and a branch channel 90A extending leftward from the channel 88*c* around the valve seat and communicating with the body opening 82*a* of the branch channel 82 in the two-way connecting block coupling 64 of the third line T3. The main channel 89 connects the main channel 81 in the block coupling 64 of the third line T3 to the forward or rearward channel 87 in the one-way connecting block coupling 65 of the third line T3 to permit or block the communication between the channels.

The two-way connecting block coupling 64 of the second line T2 has the same construction as the two-way connecting block coupling 64 of the third line T3, and like portions are designated by like reference numerals and symbols.

The one-way connecting block coupling 67 of the second line T2 is a block coupling having no channel for shutting off a forward or rearward channel.

The channels 88 in the two-way connecting valve body 54*a* of the second line T2 have the same structure as the channels 88 in the two-way connecting valve body 54*a* of the third line T3, and like portions are referred to by like reference numerals and symbols. While the main channel 89 renders the outlet 81*a* of the main channel 81 in the block coupling 64 of the second line T2 closable or openable, the forward flow of a fluid through the main channel 89 is blocked by the one-way connecting block coupling 67 of the second line T2 serving for shutting off.

The two-way connecting block coupling 64A of the first line T1 has a recessed portion 64*c* for fitting in the lateral projection 64*b* of the block coupling 64 of the second line T2, but has no lateral projection 64*b* to avoid interference with the line 14 adjacent thereto. The only channel formed in the coupling 64A is a channel 81 extending forward or rearward in the midportion, with respect to the lateral direction, of its body 64*a* and V-shaped when seen from the lateral direction.

Thus, among the two-way connecting block couplings 64, 64A of the line interconnecting means 50, the coupling 64A positioned at one end of the means 50 (where the coupling interferes with other line I4) has no lateral projection 64*b* and no branch channel 82, while the other couplings each have the lateral projection 64*b* and the branch channel 82.

The one-way connecting block coupling 67 of the first line T1 is a block coupling having no channel for shutting off a forward or rearward channel.

The two-way connecting valve body 54*a* of the first line T1 has channels 88 which include a main channel 89 comprising an inlet channel 88*a*, channel 88*c* around the valve seat and outlet channel 88*b*, and a branch channel 90B extending rightward from the channel 88*c* around the valve seat and communicating with the projection opening 82*b* of the branch channel 82 in the two-way connecting block coupling 64 of the second line T2. While the main channel 89 renders the outlet 81*a* of the main channel 81 in the block coupling 64 of the first line T1 closable or openable, the forward flow of a fluid through the main channel 89 is blocked by the one-way connecting block coupling 67 of the first line T1 serving for shutting off.

With the line interconnecting means 50 described above, the forward or rearward main channel 81 of the two-way connecting block coupling 64 of each of the third and fourth lines T3, T4 is connected to the forward or rearward channel 87 of the rear block coupling 65 by the main channel 89 of the two-way connecting valve body 54*a* of the shut-off valve 54, and the forward flow of fluid through the forward or rearward channels 81, 87, 89 is suitably blocked or permitted by the operation of the actuator 54*b* of the shut-off valve 54.

In the case of the first and second lines T1, T2, there is no forward flow of fluid even when the actuator 54*b* of the shut-off valve 54 is opened since the rear block coupling 67 is used for shutting off. On the other hand, the first line T1 is always in communication with the second line T2 via the branch channels 90B, 82, 90A, so that the fluid is flowable from the first line T1 to the second line T2 and vice versa regardless of whether the actuator 54*b* of the shut-off valve 54 is open or closed.

For example, in the case where the shut-off valve 54 of the first line T1 is open, the shut-off valve 54 of the second line T2 is open, the shut-off valve 54 of the third line T3 is closed, and the shut-off valve 54 of the fourth line T4 is closed, the fluid (treatment gas) introduced into the first line T1 and the fluid (treatment gas) introduced into the second line T2 flow through all the branch channels 90B, 82, 90A, 90B, 82, 90A, 90B, 82, 90A and are discharged from the outlet of the fourth line T4.

In this way, forward or rearward channels are connected together and lines are interconnected by the line interconnecting means 50 for controlling various gases for the distribution or mixing of treatment gases or purging with a purge gas. The lateral projection 64*b* provided on a two-way connecting block coupling 64 is fitted into the recessed portion 64*c* formed in another two-way connecting block coupling 64 or 64A laterally adjacent thereto, whereby the two couplings are positioned in place with respect to the lateral direction. Accordingly, the two-way connecting block couplings 64, 64A of the line interconnecting means 50 serve not only the function of dividing a fluid but also the function of positioning the components in place.

In the case where up to three lines are to be connected by the line interconnecting means 50, the second line T2 and/or the third line T3 may be removed, or when at least five lines are to be connected by the line interconnecting means 50, a required number of lines having, for example, the same construction as the second line T2 or third line T3 may be additionally provided between the second line T2 and the third line T3.

The quintuple bridge pipe block 76 provided at the inlet side of the mass flow controller 2 is provided with channels corresponding to the branch channels 82 in the two-way connecting block couplings 64 of the line interconnecting means 50, in a number equal to the number of lines, whereas the bridge pipe block 76 can be dispensed with by providing the line interconnecting means 50 also at the inlet side of the mass flow controller 2 in place of the block 76.

What is claimed is:

1. A fluid control apparatus which comprises a plurality of lines, each of the lines comprising a lower layer having a plurality of coupling members arranged in a front-to-rear direction and an upper layer having a plurality of fluid control devices arranged in a front-to-rear direction and wherein a front and a rear block coupling serving as lower layer components of each line and a shut-off valve mounted as an upper layer component on both the front and rear block couplings are arranged laterally of the line, a front-to-rear channel in the front block coupling and a front-to-rear channel in the rear block coupling being closable or openable by operating an actuator of the shut-off valve, the fluid control apparatus being characterized in that at least one of line interconnecting means interconnecting a first and a second line adjacent to each other laterally thereof comprises a lateral projection formed on one of the front and rear block couplings of the first line, a recessed portion formed in the block coupling of the second line for the lateral projection to fit in, a coupling branch channel formed in the block coupling provided with the lateral projection and having an end opening in a coupling body upper surface and another end opening in an upper surface of the lateral projection, a first valve body branch channel formed in a body of the shut-off valve of the first line for always causing a main channel in the valve body to communicate with the coupling body upper surface opening of the coupling branch channel, and a second valve body branch channel formed in a body of the shut-off valve of the second line for always causing a main channel in the valve body to communicate with the lateral projection upper surface opening of the coupling branch channel.

2. A fluid control apparatus according to claim 1 wherein at a location where there is no line interconnecting means, a fluid control portion for closing or opening a front-to-rear channel is provided by a front one-way connecting block coupling having a front-to-rear channel and having no lateral channel, a rear one-way connecting block coupling having a front-to-rear channel and having no lateral channel and a one-way connecting valve body having a front-to-rear channel and having no lateral channel, and at a location where there is the line interconnecting means, a fluid control portion for closing or opening a front-to-rear channel and for closing or opening a branch channel is provided by a front or rear two-way connecting block coupling having a front-to-rear main channel and a lateral branch channel, a rear or front one-way connecting block coupling having a front-to-rear channel and having no lateral channel and a two-way connecting valve body having a front-to-rear main channel and a lateral branch channel.

3. A fluid control apparatus according to claim 2 wherein the contour of the two-way connecting block coupling is one of the shape of the one-way connecting block coupling provided with the lateral projection only, the shape thereof provided with the recessed portion only and the shape thereof provided with both the lateral projection and the recessed portion.

4. A fluid control apparatus according to claim 1 wherein the plurality of lines include an inert gas line, a treatment gas line and purge gas line, and not only the inert gas line and the treatment gas line but also the purge gas line comprises the lower layer and the upper layer.

5. A fluid control apparatus according to claim 1 wherein coupling members including the block couplings and providing the lower layer are fixed in intimate contact with one another to a base plate with screw members and are thereby positioned in place with respect to the front-to-rear direction.

6. A fluid control apparatus according to claim 5 wherein a mass flow controller is arranged on two block couplings spaced apart from each other by a spacer provided therebetween.

7. A fluid control apparatus according to claim 3 wherein the lateral projection provided on the two-way connecting block coupling is fitted into the recessed portion formed in the two-way connecting block coupling laterally adjacent thereto for positioning with respect to the lateral direction.

8. A fluid control apparatus according to claim 3 wherein the line interconnecting means comprises a plurality of two-way connecting block couplings one of which is positioned at one end of the line interconnecting means and has no lateral projection and no branch channel, and the others of which each have the lateral projection and the branch channel.

9. A fluid control apparatus according to claim 2 wherein the front-to-rear channel in the front block coupling and the front-to-rear channel in the rear block coupling are V-shaped when seen from the lateral direction, and the branch channel in the two-way connecting block coupling is V-shaped when seen from the front-to-rear direction.

* * * * *